PHOTORESPONSIVE INFRARED TARGET SCANNING APPARATUS

Filed Nov. 8, 1963 3 Sheets-Sheet 1

United States Patent Office 3,291,991
Patented Dec. 13, 1966

3,291,991
PHOTORESPONSIVE INFRARED TARGET SCANNING APPARATUS

Arno Welti, Zurich, Switzerland, assignor to Albiswerk Zurich A.G., Zurich, Switzerland, a Swiss corporation Filed Nov. 8, 1963, Ser. No. 322,439
Claims priority, application Switzerland, Nov. 19, 1962, 13,554/62
12 Claims. (Cl. 250—83.3)

My invention relates to an infrared tracking apparatus suitable for continuously indicating the travel error of a remotely guided missile or other flying object, and is described hereinafter with reference to the accompanying drawings in which.

In tracking systems of the missile-target coincidence type, each departure of the missile from the proper course of travel, defined by the optical axis of the tracking apparatus, manifests itself by migration of the image spot of the missile plume, produced in the image area of the tracking optical system, out of the area center. Accordingly, the coordinates of the image spot in the image area of the apparatus constitute a measure of the directional departure of the missile and for the correction needed to eliminate such departure.

In an infrared tracking apparatus, the coordinates of the image spot are ascertained, when operating with a single infrared detector cell, by a scanner or chopper disc which during tracking rotates in the image plane of the tracking optical system. In one infrared tracking apparatus, designed for self-guiding flying objects (hereinafter generally referred to as missiles even though other vehicles such as aircraft may be involved), the polar coordinates of an image point in the image plane are electrically reproduced with the aid of a scanner disc whose polar pattern of radial gaps or spokes (area elements) has a width varying sinusoidally in the peripheral direction. Furthermore, the scanner disc is subdivided into concentric ring zones having different numbers of gaps or area elements from zone to zone respectively. Such a scanner disc, whose axis of rotation coincides with the optical axis of the apparatus, produces a pulse-width modulation of the light beam directed from the image point onto the detector cell. The modulated output signal of the detector cell is converted in a discriminator stage to a harmonic alternating voltage whose frequency is a measure of the radial distance between the image point and the disc center and whose phase position is indicative of the angular position of the image point with respect to a fixed reference direction in the image plane.

For practical reasons, the zero point of the coordinate system in which the scanner disc operates does not, as a rule, coincide with the center point of the image area.

This makes it necessary to transform the coordinates optically or electrically before they issue, as electric signals, from the electronic portion of the tracking apparatus. It has been found, however, that such transformation, with a stepwise representation of the target-image coordinates, may result in large errors.

Another known scanner disc for infrared tracking equipment avoids this disadvantage by having the arcuate length or circular measure in radians of the gap and spoke width throughout the entire scanner pattern shaped as a continuous function of the distance from the disc center.

Figure 1:
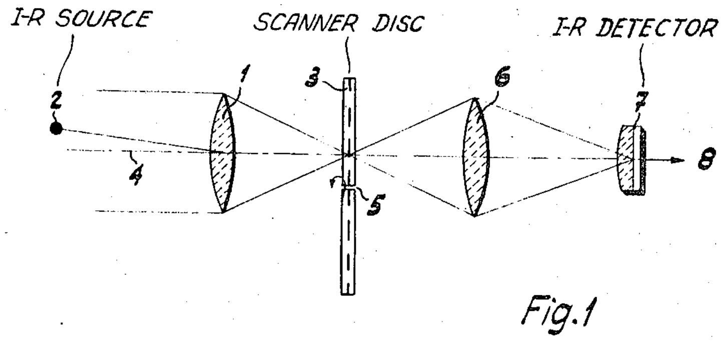
FIG. 1 shows schematically the optical portion of an infrared tracking apparatus.

The optical portion of such an infrared tracking apparatus, as schematically shown in FIG. 1, comprises an objective lens 1 for receiving infrared radiation issuing from a radiation source 2, a scanner or chopper disc 3 rotating in the image plane of the optical system and having an axis of rotation 5 located outside of the optical axis 4, furthermore a collector lens 6 and a radiation-sensitive detector cell 7. The detector cell 7 furnishes in its output circuit electric pulses, indicated by an arrow 8, which correspond to the radiation pulses produced by the rotation of the scanner disc 3.

Figure 2:
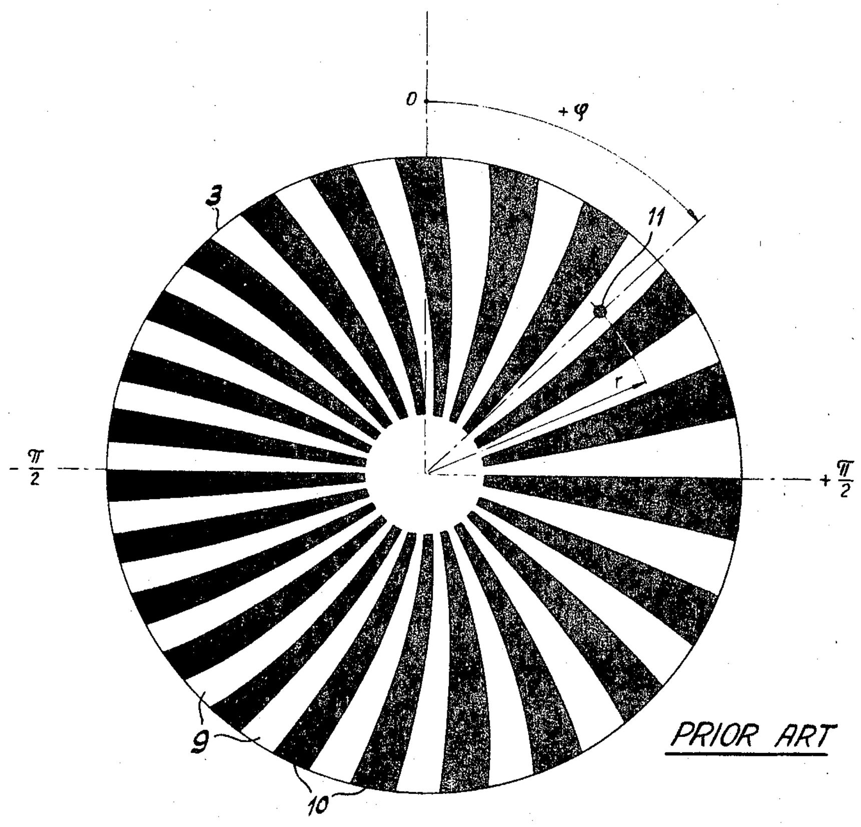
FIG. 2 is a front view of a reticle or chopper disc of the type heretofore used in such infrared systems for interrupting the infrared input to an infrared (I-R) detector so as to produce a pulse-modulated signal at the output of the detector.

The scanner disc 3 shown on enlarged scale in FIG. 2 and corresponding to a known design, possesses a polar pattern composed of a multiplicity of radiation-transparent gaps 9 and opaque spokes 10. The arcuate dimension of the spoke and gap width varies sinusoidally in the peripheral direction and is also a continuous function of the distance from the disc center. In the illustrated case, the arcuate dimension or circular measure in radians of the gap width is proportional to the distance from the disc center.

The calculation of the effective gap width is based upon the following geometric consideration:

The arcuate dimension of any chosen gap width in the phase position $\varphi$ on a concentric circle within the area of the scanner disc may be set as: $\Delta\varphi$. According to the premises, the arcuate dimension, whose minimum must necessarily possess a positive value, varies along the periphery in accordance with a sine function; so that the gap function can be written:

(1) $$\Delta\varphi=\eta\Delta\varphi_{max}+\Delta\varphi_{max}\cdot\sin\varphi=\Delta\varphi_{max}(\eta+\sin\varphi)$$

In this formula $\Delta\varphi_{max.}$ denotes the amplitude, $\Delta\varphi_{max.}(\eta+1)$ the maximum ($\varphi=+\pi/2$), $\Delta\varphi_{max.}(\eta-1)$ the minimum ($\varphi=-\pi/2$) and $\eta$ a magnitude of the gap function that is dependent upon the chosen radius $r$ of the concentric circle. The sum of all arcuate dimensions of the gaps 9 as well as of the spokes 10, which for example may have pairwise the same widths and whose respective numbers are equal to "$n$," must satisfy the following condition for a semicircle:

(2)

$$\pi=2\sum^{n}\Delta\varphi=2\sum^{n}\Delta\varphi_{max.}(\eta+\sin\varphi)=2n\Delta\varphi_{max.}\eta+2\Delta\varphi_{max.}\sum^{n}\sin\varphi$$

The semicircle extends from the minimum ($\varphi=-\pi/2$) to the maximum ($\varphi=+\pi/2$). Consequently, in the sum (2), the second term becomes equal to zero because:

(3) $$\sum^{n}\sin\varphi=\int_{-\pi/2}^{+\pi/2}\sin\varphi\, d\varphi=0$$

Consequently, the amplitude of the gap function $\Delta\varphi_{max}$, in dependence upon $\eta$ and hence in dependence upon the chosen radius $r$ of the concentric circle, can be computed. From (4) $$\pi=n\Delta\varphi_{max.}\eta,\ \therefore\ \Delta\varphi_{max.}=\frac{\pi}{2n\eta}$$

The arcuate dimension $\Delta\varphi$ of any gap width thus can be expressed in dependence upon the phase angle $\varphi$ as follows:

(5)

$$\Delta\varphi=\Delta\varphi_{max}\cdot(\eta+\sin\varphi)=\frac{\pi}{2n\eta}(\eta+\sin\varphi)=\frac{\pi}{2n}+\frac{\pi}{2n\eta}\sin\varphi$$

Now, $\eta$ can be expressed, for example, as being inversely proportional to the radius $r$, whereby the arcuate measure becomes proportional to the radius $r$. Inserting $r_o$, a constant, and $$\eta=\frac{r_o}{r}>1$$

the result is:

(6) $$\Delta\varphi=\frac{\pi}{2n}+\frac{\pi}{2n}\cdot\frac{r}{r_o}\sin\varphi$$

The scanner disc equipped with such a polar pattern chops, when rotating at constant speed, the radiation ooming from the target image in the image plane of the tracking optical system so as to produce width-modulated radiation pulses. The pulse width of these radiation pulses is jointly indicative of both polar coordinates $r$, $\varphi$ of the target-image point 11 (FIG. 2). That is, the sinusoidal pulse-width modulation superimposed upon an average pulse width is proportional to the radius $r$, and the phase position with respect to a fixed zero position is proportional to the angle $\varphi$. The detector cell 7 converts the impinging radiation process into correspondingly modulated electric pulses.

Figure 3:
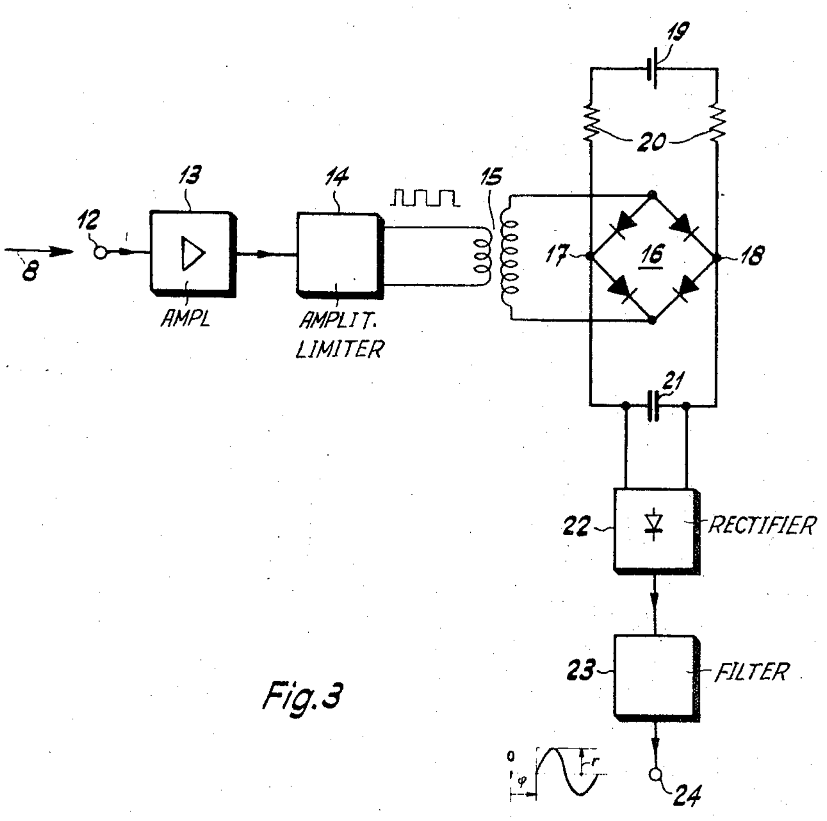
FIG. 3 is a block diagram of an electric discriminator network for converting the output pulses of the I-R detector into an alternating voltage.

The output 8 of the detector cell 7 in form of the pulse-modulated electric signal passes to the input terminal 12 of the electronic portion in the infrared tracking apparatus, thence through an amplifier 13 and an amplitude limiter 14 to a pulse transformer 15 according to the schematic diagram shown in FIG. 3. The amplifier 13 inverts the signal so that the gap signals correspond to the nulls in the amplifier output. The output signal of transformer 15 controls an electronic switch in form of a rectifier bridge 16 connected in the discharge circuit of a capacitor 21. The rectifier bridge 16 constitutes between its diagonal points 17 and 18 a high resistance determined by the blocking resistance of the rectifiers when the control signal is zero. That is, under these conditions the switching device constituted by the rectifier bridge network 16 is open. However, the rectifier bridge constitutes a low resistance and consequently a closed switch when the rectifiers are traversed by current caused by a control signal. When the switch is open, and consequently during the control signal, a direct-current source 19 charges the capacitor 21 through series-connected resistors 20. When the switch network 16 is closed, during the pulses pauses of the control signal, the capacitor discharges through the switch. In this manner, there occur at the capacitor 21 corresponding voltage pulses whose amplitudes are proportional to the width of the control pulse. These voltage pulses are rectified in a linear rectifier 22 and pass through a filter stage 23 in which the pulse frequency is suppressed. As a result, the output voltage at terminal 24 constitutes a harmonic alternating voltage whose amplitude is proportional to the radious $r$ and whose phase position is proportional to the angle $\varphi$ of the spot momentarily occupied by the target-image point in the image plane. Consequently, the voltage vector of this alternating voltage constitutes an analog image of the target-image vector, relative to the center of the scanner disc. For converting the polar coordinates into a coordinate system relating to the image-area center formed by the optical axis, a constant alternating voltage of suitable amplitude and phase position can be superimposed upon the alternating voltage appearing as the output of the filter stage 23.

The phase-zero position, required for the phase measurement, is obtained in conventional manner with the aid of a reference signal supplied in the same manner as the target-image signal from a radiation source that is stationary with respect to the optical axis of the apparatus, the phase-reference signal being preferably supplied through a separate optical and electrical channel.

When the described infrared tracking apparatus is remotely to guide a flying object or missile, the missile with the infrared radiation source constituted by its driving assembly or its plume, forms the target to be tracked by the tracking apparatus, in contrast to the target proper that is to be hit by the missile and, for example, is being tracked optically. For distinction, the infrared target constituted by the image of the missile is hereinafter referred to as the "aim" or "plume." When operating on the target-coincidence principle, the aim (missile) being tracked by the tracking device during the guiding performance moves further and further away from the location of the tracking apparatus the more closely the aim (missile) approaches the point of impact with the target to be hit. During such travel, the infrared radiation issuing from the missile plume and received by the tracking apparatus becomes progressively weaker so that the signal-to-noise ratio and consequently the measuring accuracy decrease correspondingly. This also reduces the remote-guiding accuracy although it is desirable that this accuracy should be particularly great as the missile approaches the target. Since, an account of the above-mentioned coordinate transformation, the measuring accuracy is furthermore reduced with increasing distance of the scanner-disc axis from the optical axis, this distance is kept as small as feasible. However, in the vicinity of the disc center, the arcuate dimension of the gap width and thus the signal intensity is the smallest. For these reasons, the accuracy of the known infrared tracking systems leaves much to be desired particularly when the missile reaches the vicinity of the target.

It is an object of my invention to avoid or greatly minimize such reduction in accuracy and to achieve the highest possible signal-to-noise ratio in the center area of the infrared image plane of tracking apparatus generally corresponding to the above-mentioned type.

According to a feature of my invention, the scanner or chopper disc, rotatable in the image plane of the infrared optical system, has a polar pattern wherein the arcuate dimension of the spoke width and/or gap width is not proportional to the distance from the disc center but is inversely proportional thereto. Referring to the Equations (1) and (5), the arcuate dimension of the spoke and/or gap width for $$\eta=\frac{r}{r_o}>1$$

then amounts to:

(7) $$\Delta\varphi=\frac{\pi}{2n}+\frac{\pi}{2n}\cdot\frac{r_o}{r}\sin\varphi$$

Figure 5:
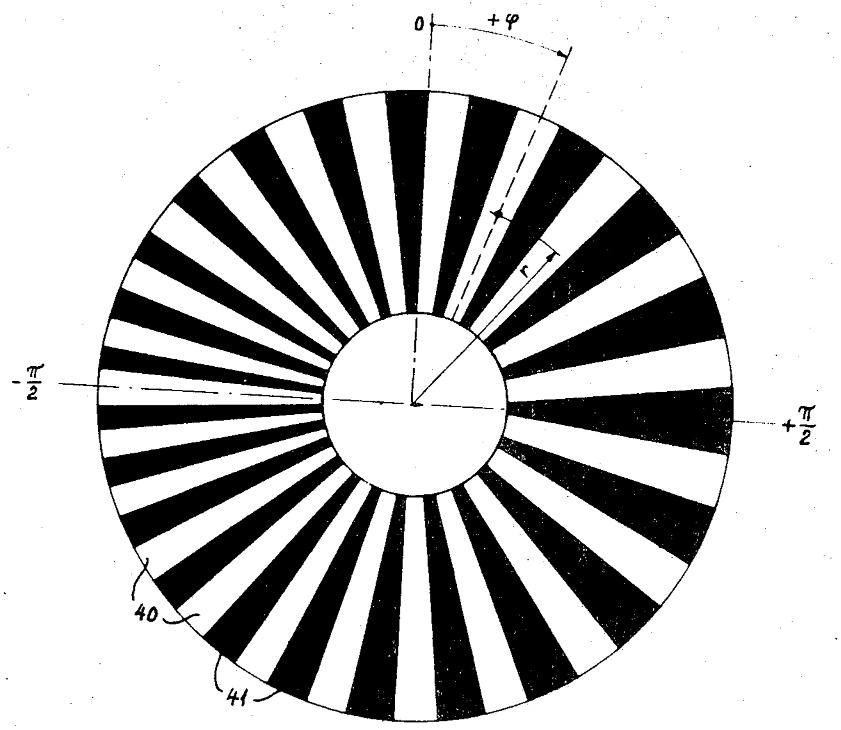
FIG. 5 is a plan view of a chopper disc according to the invention to be used in a system otherwise corresponding to FIG. 1 in combination with FIGS. 3 and 4.

The embodiment of a scanner disc according to the invention shown in FIG. 5 has a polar pattern comprising a multiplicity of transparent gaps 40 and opaque spokes 41. The arcuate dimension of the gap width varies sinusoidally in the peripheral direction and is also inversely proportional to the radial distance from the disc center. This law of dimensioning applies in the illustrated example only to the gaps 40; that is, the spokes 41 do not have the same arcuate width as the gaps 40. Under such conditions the gaps 40 can be arranged symmetrically to radial center lines so that the gap edges are linear which considerably simplifies the production of the pattern. If desired, however, the scanner disc according to the invention can be provided in the same manner as the known scanner disc according to FIG. 2, with a pattern in which the gaps and spokes have pairwise the same widths.

Figure 4:
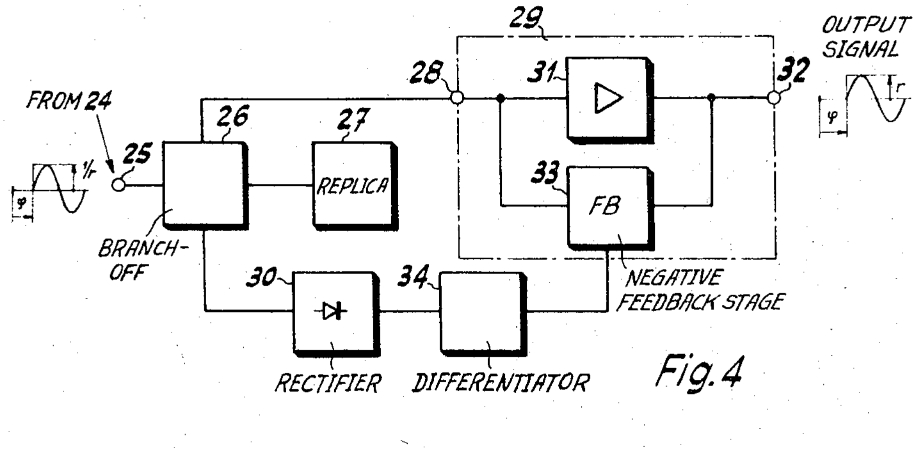
FIG. 4 is a schematic block diagram of an electric converter network embodying features of the invention for converting the output voltage of the discriminator network into a different voltage that constitutes an analog representation of the target-image vector.

On account of the inverse relation of the arcuate gap-width dimensions to the radial distance, the amplitude of the alternating voltage appearing at the ouput terminal 24 (FIG. 3) of the discriminator stage is likewise inversely proportional to the radius $r$. Consequently, an additional stage is required for converting this output signal into an alternating voltage whose amplitude is proportional to the radius $r$. An embodiment of such an additional stage is shown in FIG. 4. This stage has its input terminal 25 connected to the output terminal of the preceding discriminator stage in FIG. 3 which in turn is connected to an infrared optical system according to FIG. 1 but equipped with a scanner disc according to the invention such as exemplified in FIG. 5. The converter stage shown in FIG. 4 is essentially an analog electronic computer whose output function constitutes the inversion of the input function. The signal supplied to the input terminal 25, being inversely proportional to the radius $r$, passes through a branch-off 26 to the input terminal 28 of a negative-feedback-coupled amplifier 29 and simultaneously to a rectifier 30, a replica circuit 27 being also connected to the branch-off stage 26. The amplifier 29 consists essentially of an amplifier stage 31 proper to which the output terminal 32 is connected, and a negative feedback stage 33. The signal taken from the rectifier 30 and differentiated in member 34 to form a time-differential voltage, controls the negative feedback factor $\beta$ of stage 33 so that this factor is always in accordance with: $\beta \sim 1/r^2$. The total amplification A of amplifier 29 thus amounts, for a gain G of amplifier stage 31, to $$A=\frac{G}{1+\frac{k}{r^2}G}$$

$k$=constant

For a high amplification G and a high negative feedback (i.e. $\beta G >> 1$), the total amplification is:

$$A=\frac{r^2}{k}$$

Since the signal amplitude at the input terminal 28 is proportional to $1/r$, the signal amplitude at the output terminal 32 is directly proportional to the radius $r$.

A scanner pattern according to the invention as described above has the further additional advantage of being applicable as a space filter in infrared tracking apparatus for suppressing large-area disturbing radiators. Such space filters are constituted by lattice or grid structures which are movable in the image plane of the infrared optical system, for example lattice-gap structures, whose gap width is in the order of magnitude of the plume-image diameter. Since the missile to be tracked in most cases is represented in the image area of the tracking optic only as a structureless spot when the vessel reaches a relatively short distance from the tracking apparatus, the gap width of the space filter can be reduced down to the diameter of the image spot (usually constituted by a defraction dot). As a result, the space filter suppresses all disturbing radiators that are appreciably larger than the aim-image point.

Now, instead of providing a separate space filter, the polar-pattern scanner disc employed for determining the image-spot coordinates can be simultaneously used as a space filter by choosing the number of the spokes and gaps of such size that the gap width at the smallest location of the gap is not larger than the diameter of the defraction spot. Since the effective gap width varies from the center to the periphery of the disc to a smaller extent if the arcuate dimension of the gap width is inversely instead of directly proportional to the distance from the center, the polar pattern according to the invention affords an appreciably better space filtering action, thus more closely approaching the optimal effect achievable if the gap width were constant. The sinusoidal variation of the gap width in the peripheral direction is less appreciable in this respect. In fact, the effective gap width $\Delta b$ becomes more uniform than with unmodulated discs where $$\Delta b'=\frac{\pi}{2n}\cdot r$$

This is because $\Delta b'$ becomes superimposed according to Equation 7, in each position $\varphi$ by a radius-constant additional member:

$$\Delta b=\Delta\varphi r=\frac{\pi r}{2n}+\frac{\pi}{2n}r_o \sin \varphi \qquad (8)$$

In principle, scanner discs having a gap pattern according to the invention are also applicable for infrared tracking apparatus in self-guided missiles, aircraft or other flying objects.

To those skilled in the art it will be obvious from a study of this disclosure that my invention permits of a variety of modifications, particularly with respect to the optical system and the electronic components employed in conjunction with a scanner disc, and hence can be given embodiments other than particularly illustrated and described herein, without departing from the essential features of my invention and within the scope of the claims annexed hereto.

I claim:

1. An infrared tracking apparatus comprising a tracking optic having an image plane, a scanner disc rotatable in said image plane and having a polar gap pattern having a gap width which varies sinusoidally in the peripheral direction, said disc having a center, said gap width having throughout said polar pattern a circular measure in radians which is inversely proportional to the radial distance from the disc center, an infrared detector for providing a signal pulse width-modulated by said disc, in accordance with the polar coordinates on said disc of the image point of a tracked target, and a discriminator network connected to said detector for converting said signal to a harmonic alternating output voltage and having a conversion characteristic adapted to the inverse proportionality of gap width to radial distance so that said output voltage is an analogue of the target-image vector, said discriminator network including an amplifier for said signal having an input and an output and a negative feedback coupling between the output and the input of said amplifier.

2. An infrared tracking apparatus as claimed in claim 1, wherein said scanner disc comprises a plurality of alternate spokes and gaps of a number selected to provide a gap width which at the smallest position thereof is essentially equal to the diameter of the diffraction image of the target tracked.

3. An infrared tracking apparatus as claimed in claim 1, wherein the negative feedback coupling of said discriminator network has a feedback coupling factor which is inversely proportional to the square of the distance of the gap width from the disc center.

4. An infrared tracking apparatus as claimed in claim 1, wherein said scanner disc comprises a plurality of alternate spokes and gaps, said spokes being opaque to infrared radiation and said gaps being transparent to infrared radiation.

5. An infrared tracking apparatus as claimed in claim 1, wherein said scanner disc comprises a plurality of alternate spokes and gaps, each of said spokes and each of said gaps comprising an area bounded by an outer arc of the circle forming the periphery of said disc, an inner arc of a circle concentric to said first-mentioned circle and having a diameter smaller than that of the said first-mentioned circle, each of said inner and outer arcs extending from a clockwise end to a counterclockwise end, a first straight line joining the clockwise ends of the inner and outer arcs and a second straight line joining the counterclockwise ends of said inner and outer arcs.

6. An infrared tracking apparatus as claimed in claim 5, wherein the circular measure in radians of the gap width is the angle between a radius from the disc center to the clockwise end of the arc of the circle on which said gap width is to be measured and a radius from said disc center to the counterclockwise end of said arc of said last-mentioned circle.

7. An infrared tracking apparatus as claimed in claim 5, wherein some of said straight lines are radii of said disc and some of said straight lines are parts of chords of said disc.

8. In infrared tracking apparatus, a rotatable scanner disc having a center and a polar gap pattern having a gap width which varies sinusoidally in the peripheral direction, said gap width having throughout said polar pattern a circular measure in radians which is inversely proportional to the radial distance from the center of the disc.

9. A rotatable scanner disc as claimed in claim 8, wherein said scanner disc comprises a plurality of alternate spokes and gaps, said spokes being opaque to infrared radiation and said gaps being transparent to infrared radiation.

10. A rotatable scanner disc as claimed in claim 8, wherein said scanner disc comprises a plurality of alternate spokes and gaps, each of said spokes and each of said gaps comprising an area bounded by an outer arc of the circle forming the periphery of said disc, an inner arc of a circle concentric to said first-mentioned circle and having a diameter smaller than that of the said first-mentioned circle, each of said inner and outer arcs extending from a clockwise end to a counterclockwise end, a first straight line joining the clockwise ends of the inner and outer arcs and a second straight line joining the counterclockwise ends of said inner and outer arcs.

11. A rotatable scanner disc as claimed in claim 10, wherein the circular measure in radians of the gap width is the angle between a radius from the disc center to the clockwise end of the arc of the circle on which said gap width is to be measured and a radius from said disc center to the counterclockwise end of said arc of said last-mentioned circle.

12. A rotatable scanner disc as claimed in claim 10, wherein some of said straight lines are radii of said disc and some of said straight lines are parts of chords of said disc.

References Cited by the Examiner

UNITED STATES PATENTS

| | | | |
|---|---|---|---|
| 2,931,912 | 4/1960 | MacLeish | 250—233 |
| 3,002,098 | 9/1961 | Watkins | 250—233 |
| 3,160,751 | 12/1964 | Dunning | 250—83.3 |

RALPH G. NILSON, *Primary Examiner.*

JAMES W. LAWRENCE, *Examiner.*